US012124606B2

(12) United States Patent
Gaddam et al.

(10) Patent No.: US 12,124,606 B2
(45) Date of Patent: Oct. 22, 2024

(54) METHOD, SYSTEM, AND COMPUTER PROGRAM PRODUCT FOR SECURELY RENDERING SENSITIVE DATA

(71) Applicant: Visa International Service Association, San Francisco, CA (US)

(72) Inventors: Sivanarayana Gaddam, Santa Clara, CA (US); Yogesh Lokhande, Karnataka (IN)

(73) Assignee: Visa International Service Association, San Francisco, CA (US)

( * ) Notice: Subject to any disclaimer, the term of this patent is extended or adjusted under 35 U.S.C. 154(b) by 295 days.

(21) Appl. No.: 17/638,212

(22) PCT Filed: Aug. 31, 2020

(86) PCT No.: PCT/US2020/048747
§ 371 (c)(1),
(2) Date: Feb. 25, 2022

(87) PCT Pub. No.: WO2021/042034
PCT Pub. Date: Mar. 4, 2021

(65) Prior Publication Data
US 2022/0327234 A1 Oct. 13, 2022

(30) Foreign Application Priority Data
Aug. 30, 2019 (IN) .............................. 201941034973

(51) Int. Cl.
*G06F 21/00* (2013.01)
*G06F 21/62* (2013.01)

(52) U.S. Cl.
CPC ................................ *G06F 21/6245* (2013.01)

(58) Field of Classification Search
CPC ..... G06F 21/6245; G06F 21/606; G06F 21/84
See application file for complete search history.

(56) References Cited

U.S. PATENT DOCUMENTS

| | | | |
|---|---|---|---|
| 7,460,726 B2 | 12/2008 | Levy et al. | |
| 9,881,297 B2* | 1/2018 | Kranzley | ............... G06Q 40/00 |
| 10,102,385 B2 | 10/2018 | Otero | |
| 11,010,734 B2* | 5/2021 | McGuire | ................ G06Q 20/10 |
| 2002/0015042 A1* | 2/2002 | Robotham | ............ G06F 3/1454 |
| | | | 345/581 |
| 2006/0008112 A1* | 1/2006 | Reed | .................... G06T 1/0085 |
| | | | 382/100 |
| 2008/0037719 A1 | 2/2008 | Doren | |

(Continued)

OTHER PUBLICATIONS

Anonymous, "Transaktionsnummer—Wikipedia", Aug. 26, 2019, pp. 1-17.

(Continued)

*Primary Examiner* — Don G Zhao
(74) *Attorney, Agent, or Firm* — The Webb Law Firm

(57) ABSTRACT

A method for securely rendering sensitive data is disclosed. A method for securely rendering sensitive data may include receiving account identifier data associated with at least one account identifier. The account identifier data may be converted into at least one non-textual visual element. The at least one non-textual visual element may be communicated to at least one receiver. The at least one receiver may render the at least one non-textual visual element. A system and computer program product are also disclosed.

17 Claims, 7 Drawing Sheets

(56) References Cited

U.S. PATENT DOCUMENTS

| | | | | |
|---|---|---|---|---|
| 2008/0140569 A1* | 6/2008 | Handel | G06Q 20/382 | 705/64 |
| 2008/0149713 A1* | 6/2008 | Brundage | G07F 7/082 | 235/435 |
| 2008/0245855 A1* | 10/2008 | Fein | G06Q 20/206 | 235/494 |
| 2009/0030845 A1* | 1/2009 | Hurry | H04L 9/12 | 705/50 |
| 2009/0057393 A1* | 3/2009 | Merkow | G06Q 20/105 | 235/379 |
| 2011/0050990 A1* | 3/2011 | Farkash | H04N 19/467 | 348/E7.001 |
| 2011/0179289 A1* | 7/2011 | Guenther | G06F 21/83 | 713/189 |
| 2013/0124412 A1* | 5/2013 | Itwaru | G06Q 30/02 | 705/44 |
| 2013/0160103 A1 | 6/2013 | Lu et al. | | |
| 2014/0212040 A1* | 7/2014 | Walker | G06V 30/1456 | 382/182 |
| 2015/0006390 A1* | 1/2015 | Aissi | G06Q 20/40 | 705/44 |
| 2015/0268894 A1* | 9/2015 | Saito | G06F 3/1206 | 358/1.16 |
| 2016/0224280 A1* | 8/2016 | Saito | G06F 3/1222 | |
| 2017/0104591 A1 | 4/2017 | Merdinger et al. | | |
| 2018/0096175 A1* | 4/2018 | Schmeling | G06F 1/3206 | |
| 2022/0067864 A1* | 3/2022 | Walsh | G16H 10/60 | |
| 2022/0121776 A1* | 4/2022 | Johnston | G06F 21/554 | |

OTHER PUBLICATIONS

Anonymous, "Bankdaten ubers WhatsApp (Betrug, Datenschutz)", Dec. 31, 2015, pp. 1-2.

Al-Juaid et al., "Enhancing PC Data Security via Combining RSE Cryptography and Video Based Steganography", Journal of Information Security and Cybercrimes Research, 2018, pp. 8-18.

Kushida et al., "Strategies for de-identification and anonymization of electronic health record data for use in multicenter research studues", Medical Care, Jul. 2012, 25 pages.

* cited by examiner

METHOD, SYSTEM, AND COMPUTER PROGRAM PRODUCT FOR SECURELY RENDERING SENSITIVE DATA

CROSS REFERENCE TO RELATED APPLICATIONS

This application is the United States national phase of International Application No. PCT/US2020/048747 filed Aug. 31, 2020, and claims priority to Indian Provisional Patent Application No. 201941034973, filed Aug. 30, 2019, the disclosures of which are hereby incorporated by reference in their entirety.

BACKGROUND

1. Field

This disclosed subject matter relates generally to methods, systems, and products for rendering sensitive data and, in non-limiting embodiments or aspects, to a method, system, and computer program product for securely rendering sensitive data using images and/or video frames.

2. Technical Considerations

Certain sensitive data (e.g., an account identifier, a primary account number (PAN), a card number, a payment card number, a token, and/or the like) may need to be displayed to a user under certain circumstances. For example, at least one user (e.g., a transaction service provider, an issuer, a customer, a merchant, an acquirer, and/or the like) may need to review records including the sensitive data, e.g., for verification, security review, fraud review, customer support, auditing, record keeping, and/or the like.

However, when sensitive data is displayed in plain form (e.g., clear text, Hypertext Markup Language (HTML), and/or the like), such display may pose certain security threats, e.g., screen scraping, malicious/curious scripts (e.g., JavaScripts and/or the like), malicious browser plugins, account takeover, session hijacking, clipboard hijacking, and/or the like.

SUMMARY

Accordingly, provided are improved methods, systems, and computer program products for securely rendering sensitive data.

According to non-limiting embodiments, provided is a method for securely rendering sensitive data. In some non-limiting embodiments, a method for securely rendering sensitive data may include receiving account identifier data associated with at least one account identifier. The account identifier data may be converted into at least one non-textual visual element. The at least one non-textual visual element may be communicated to at least one receiver.

In some non-limiting embodiments, the at least one receiver may render the at least one non-textual visual element.

In some non-limiting embodiments, the at least one non-textual visual element may include an image. Additionally or alternatively, the at least one non-textual visual element may include a video comprising at least one frame.

In some non-limiting embodiments, the at least one non-textual visual element may be encrypted to form at least one encrypted non-textual visual element. Additionally or alternatively, communicating the at least one non-textual visual element may include communicating the at least one encrypted non-textual visual element to the at least one receiver. In some non-limiting embodiments, at least one key may be exchanged with the at least one receiver. In some non-limiting embodiments, exchanging the at least one key may include embedding the at least one key in the at least one non-textual visual element.

In some non-limiting embodiments, at least one watermark may be embedded in the at least one non-textual visual element. In some non-limiting embodiments, the at least one watermark may include a digital copy of a handwritten signature. Additionally or alternatively, embedding the at least one watermark may include modifying at least one pixel of the at least one non-textual visual element based on the watermark. In some non-limiting embodiments, modifying the at least one pixel may include modifying a plurality of pixels so that the watermark (e.g., digital copy of the handwritten signature) is not perceptible by a human user.

According to non-limiting embodiments, provided is a system for securely rendering sensitive data. In some non-limiting embodiments, the system for securely rendering sensitive data may include a user device, a hardware security module (HSM), and a server. The server may be configured to receive, from the user device, a request for displaying an account identifier; retrieve, from the HSM, account identifier data associated with the account identifier; convert the account identifier data into at least one non-textual visual element; and/or communicate the at least one non-textual visual element to the user device.

In some non-limiting embodiments, the server may include a media converter. Additionally or alternatively, converting the account identifier data may include the server converting the account identifier data into the at least one non-textual visual element with the media converter.

In some non-limiting embodiments, the user device may include a browser and a renderer. Additionally or alternatively, the user device may be configured to render, with the renderer, the at least one non-textual visual element; and/or display, with the browser, the at least one non-textual visual element as rendered.

In some non-limiting embodiments, the server may be further configured to exchange at least one key with the user device; and/or encrypt the at least one non-textual visual element based on the at least one key to form at least one encrypted non-textual visual element. Additionally or alternatively, wherein communicating the at least one non-textual visual element may include communicating the at least one encrypted non-textual visual element to the user device. In some non-limiting embodiments, the user device may be further configured to: decrypt the at least one encrypted non-textual visual element based on the at least one key to form at least one decrypted non-textual visual element. Additionally or alternatively, displaying the at least one non-textual visual element may include displaying the at least one decrypted non-textual visual element.

In some non-limiting embodiments, the user device may be configured to: receive a digital copy of a handwritten signature; and/or communicate the digital copy of the handwritten signature to the server. Additionally or alternatively, the server may be further configured to: receive the digital copy of the handwritten signature from the user device; and/or embed the digital copy of the handwritten signature as a watermark in the at least one non-textual visual element. In some non-limiting embodiments, communicating the at least one non-textual visual element may include communicating the at least one non-textual visual element having the watermark embedded therein to the user device.

In some non-limiting embodiments, embedding the digital copy of the handwritten signature as the watermark may include modifying at least one pixel of the at least one non-textual visual element based on the digital copy of the handwritten signature. Additionally or alternatively, modifying the at least one pixel may include modifying a plurality of pixels so that the digital copy of the handwritten signature is not perceptible by a human user.

According to non-limiting embodiments, provided is a computer program product for securely rendering sensitive data. The computer program product may include at least one non-transitory computer-readable medium including one or more instructions that, when executed by at least one processor, cause the at least one processor to receive account identifier data associated with at least one account identifier; convert the account identifier data into at least one non-textual visual element; and/or communicate the at least one non-textual visual element to at least one receiver.

In some non-limiting embodiments, the at least one non-textual visual element may include at least one of an image, a video comprising at least one frame, any combination thereof, and/or the like.

In some non-limiting embodiments, the instructions, when executed by the at least one processor, may further cause the at least one processor to: exchange at least one key with the at least one receiver; and/or encrypt the at least one non-textual visual element based on the at least one key to form at least one encrypted non-textual visual element. Additionally or alternatively, communicating the at least one non-textual visual element may include communicating the at least one encrypted non-textual visual element to the at least one receiver.

In some non-limiting embodiments, the instructions, when executed by the at least one processor, may further cause the at least one processor to: embed at least one watermark in the at least one non-textual visual element. Additionally or alternatively, embedding the at least one watermark may include modifying at least one pixel of the at least one non-textual visual element based on the at least one watermark. In some non-limiting embodiments, modifying the at least one pixel may include modifying a plurality of pixels so that the at least one watermark is not perceptible by a human user.

Further non-limiting embodiments are set forth in the following numbered clauses:

Clause 1: A computer-implemented method, comprising: receiving, with at least one processor, account identifier data associated with at least one account identifier; converting, with the at least one processor, the account identifier data into at least one non-textual visual element; and communicating, with the at least one processor, the at least one non-textual visual element to at least one receiver.

Clause 2: The method of clause 1, wherein the at least one receiver renders the at least one non-textual visual element.

Clause 3: The method of clause 1 or 2, wherein the at least one non-textual visual element comprises an image.

Clause 4: The method of any of clauses 1-3, wherein the at least one non-textual visual element comprises a video comprising at least one frame.

Clause 5: The method of any of clauses 1-4, further comprising: encrypting, with the at least one processor, the at least one non-textual visual element to form at least one encrypted non-textual visual element, wherein communicating the at least one non-textual visual element comprises communicating the at least one encrypted non-textual visual element to the at least one receiver.

Clause 6: The method of any of clauses 1-5, further comprising: exchanging, with the at least one processor, at least one key with the at least one receiver.

Clause 7: The method of any of clauses 1-6, wherein exchanging the at least one key comprises embedding the at least one key in the at least one non-textual visual element.

Clause 8: The method of any of clauses 1-7, further comprising: embedding, with the at least one processor, at least one watermark in the at least one non-textual visual element.

Clause 9: The method of any of clauses 1-8, wherein the at least one watermark comprises a digital copy of a handwritten signature, and wherein embedding the at least one watermark comprises modifying at least one pixel of the at least one non-textual visual element based on the watermark.

Clause 10: The method of any of clauses 1-9, wherein modifying the at least one pixel comprises modifying a plurality of pixels so that the digital copy of the handwritten signature is not perceptible by a human user.

Clause 11: A system, comprising: a user device; a hardware security module (HSM); and a server comprising a media converter, the server configured to: receive, from the user device, a request for displaying an account identifier; retrieve, from the HSM, account identifier data associated with the account identifier; convert the account identifier data into at least one non-textual visual element; and communicate, with at least one processor, the at least one non-textual visual element to the user device.

Clause 12: The system of clause 11, wherein the user device comprises a browser and a renderer, and wherein the user device is configured to: render, with the renderer, the at least one non-textual visual element; and display, with the browser, the at least one non-textual visual element as rendered.

Clause 13: The system of clauses 11 or 12, wherein: the server is further configured to: exchange at least one key with the user device; and encrypt the at least one non-textual visual element based on the at least one key to form at least one encrypted non-textual visual element, wherein communicating the at least one non-textual visual element comprises communicating the at least one encrypted non-textual visual element to the user device; and the user device is further configured to: decrypt the at least one encrypted non-textual visual element based on the at least one key to form at least one decrypted non-textual visual element, wherein displaying the at least one non-textual visual element comprises displaying the at least one decrypted non-textual visual element.

Clause 14: The system of any of clauses 11-13, wherein: the user device is configured to: receive a digital copy of a handwritten signature; and communicate the digital copy of the handwritten signature to the server; and the server is further configured to: receive the digital copy of the handwritten signature from the user device; and embed the digital copy of the handwritten signature as a watermark in the at least one non-textual visual element, wherein communicating the at least one non-textual visual element comprises communicating the at least one non-textual visual element having the watermark embedded therein to the user device.

Clause 15: The system of any of clauses 11-14, wherein embedding the digital copy of the handwritten signature as the watermark comprises modifying at least one pixel of the at least one non-textual visual element based on the digital copy of the handwritten signature, and wherein modifying the at least one pixel comprises modifying a plurality of pixels so that the digital copy of the handwritten signature is not perceptible by a human user.

Clause 16: A computer program product, the computer program product comprising at least one non-transitory computer-readable medium including one or more instructions that, when executed by at least one processor, cause the at least one processor to: receive account identifier data associated with at least one account identifier; convert the account identifier data into at least one non-textual visual element; and communicate the at least one non-textual visual element to at least one receiver.

Clause 17: The computer program product of clause 16, wherein the at least one non-textual visual element comprises at least one of an image, a video comprising at least one frame, any combination thereof, and/or the like.

Clause 18: The computer program product of clauses 16 or 17, wherein the instructions, when executed by the at least one processor, further cause the at least one processor to: exchange at least one key with the at least one receiver; and encrypt the at least one non-textual visual element based on the at least one key to form at least one encrypted non-textual visual element, wherein communicating the at least one non-textual visual element comprises communicating the at least one encrypted non-textual visual element to the at least one receiver.

Clause 19: The computer program product of any of clauses 16-18, wherein the instructions, when executed by the at least one processor, further cause the at least one processor to: embed at least one watermark in the at least one non-textual visual element, wherein embedding the at least one watermark comprises modifying at least one pixel of the at least one non-textual visual element based on the at least one watermark.

Clause 20: The computer program product of any of clauses 16-19, wherein modifying the at least one pixel comprises modifying a plurality of pixels so that the at least one watermark is not perceptible by a human user.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
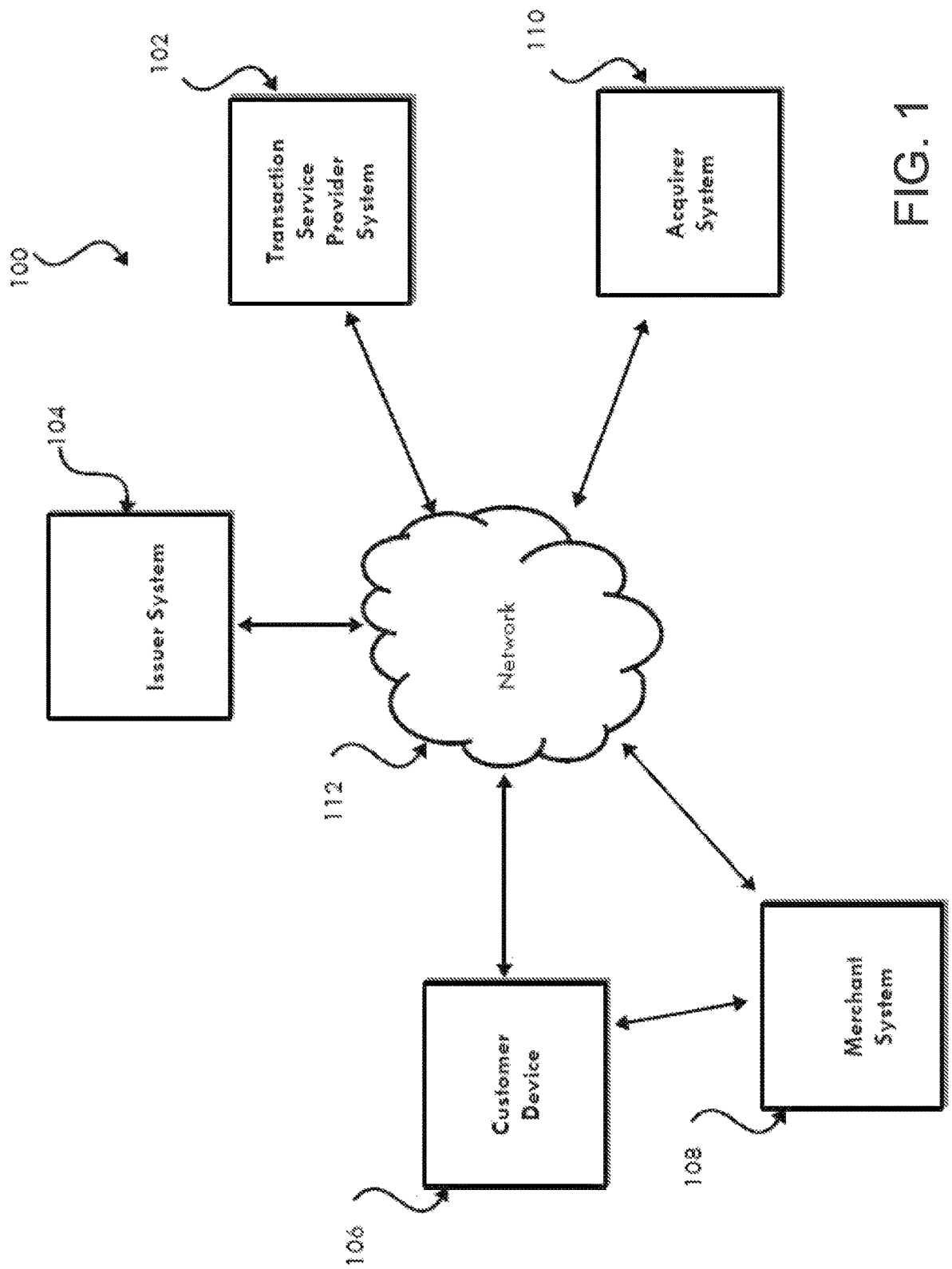
FIG. 1 is a diagram of a non-limiting embodiment of an environment in which methods, systems, and/or computer program products, as described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument (e.g., a payment card) and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments or aspects of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term "token service provider" may refer to an entity including one or more server computers in a token service system that generates, processes, and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions originated from the acquirer may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for securely rendering sensitive data, including, but not limited to, securely rendering sensitive data using non-textual visual elements (e.g., at least one of an image, a video frame, and/or the like). For example, non-limiting embodiments or aspects of the disclosed subject matter provide rendering (e.g., visually displaying and/or the like) sensitive data with at least one non-textual visual element, which may prevent malicious attacks (e.g., screen scraping, malicious/curious scripts (e.g., JavaScripts and/or the like), malicious browser plugins, account takeover, session hijacking, clipboard hijacking, and/or the like) while still making the sensitive data viewable by an authorized user. For example, since the sensitive data is not displayed in plain form (e.g., clear text, HTML, and/or the like), such sensitive data may not be easily identified, copied, distributed, and/or the like by a malicious attacker.

For the purpose of illustration, in the following description, while the presently disclosed subject matter is described with respect to methods, systems, and computer program products for securely rendering sensitive data, e.g., account identifiers, one skilled in the art will recognize that the disclosed subject matter is not limited to the illustrative embodiments. For example, the methods, systems, and computer program products described herein may be used with a wide variety of settings, such as securely rendering sensitive data in any suitable setting (e.g., social security numbers, personally identifying information, contact information, healthcare information, tax information, confidential information, privileged information, trade secret information, and/or the like).

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
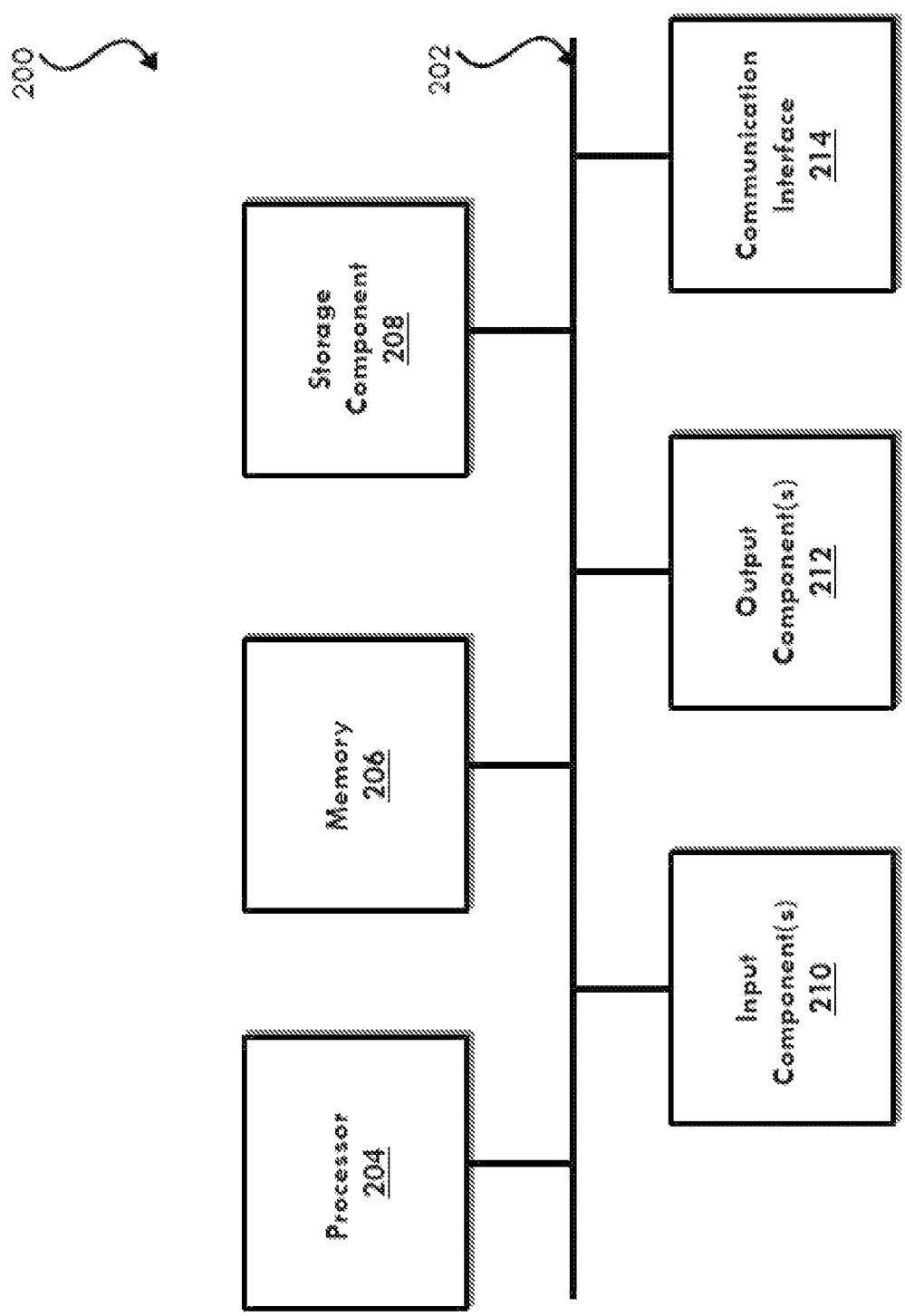
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
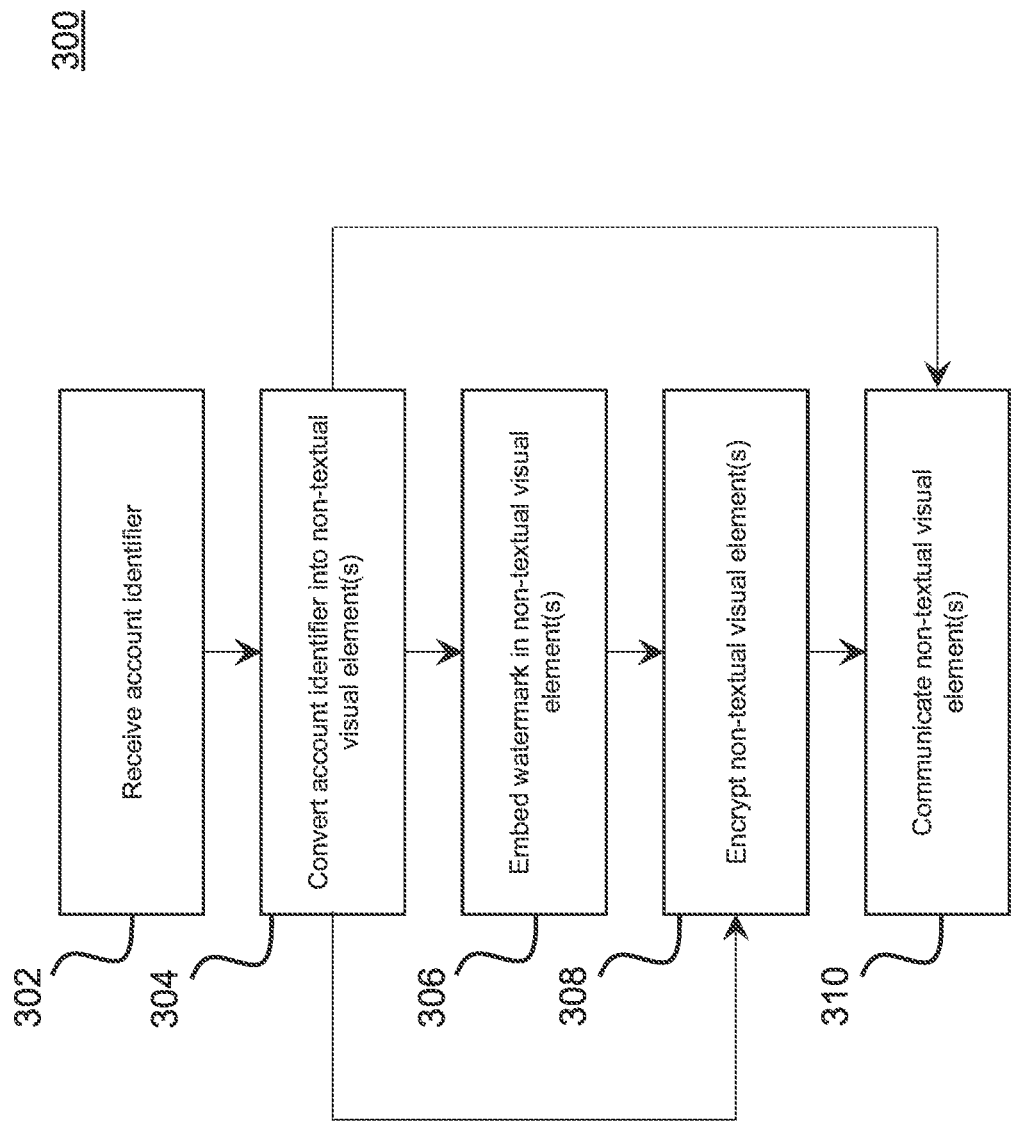
FIG. 3 is a flowchart of a non-limiting embodiment of a process for securely rendering sensitive data according to the principles of the presently disclosed subject matter.

Referring now to FIG. 3, FIG. 3 is a flowchart of a non-limiting embodiment of a process 300 for securely rendering sensitive data. In some non-limiting embodiments, one or more of the steps of process 300 may be performed (e.g., completely, partially, and/or the like) by transaction service provider system 102 (e.g., one or more devices of transaction service provider system 102). In some non-limiting embodiments, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), and/or the like. In some non-limiting embodiments, a web server may be the same as, similar to, and/or part of transaction service provider system 102. Additionally or alternatively, the web server may be the same as, similar to, and/or part of another system, another device, another group of systems, or another group of devices, separate from or including transaction service provider system 102, such as issuer system 104 (e.g., one or more devices of issuer system 104) and/or the like. In some non-limiting embodiments, a user device may be the same as, similar to, and/or part of customer device 106. Additionally or alternatively, the user device may be the same as, similar to, and/or part of another system, another device, another group of systems, or another group of devices, separate from or including customer device 106, such as issuer system 104 (e.g., one or more devices of issuer system 104), merchant system 108 (e.g., one or more devices of merchant system 108), and/or the like.

As shown in FIG. 3, at step 302, process 300 may include receiving at least one account identifier. For example, a web server (e.g., transaction service provider system 102) may receive account identifier data associated with at least one account identifier. In some non-limiting embodiments, the web server may retrieve the account identifier from a database (e.g., a transaction database of transaction service provider system 102 and/or the like).

In some non-limiting embodiments, the account identifier may include a primary account number (PAN), as described herein. In some non-limiting embodiments, the account identifier data may include the PAN (e.g., in plain text). Additionally or alternatively, the account identifier data may include an encrypted PAN (e.g., encrypted using a secret key and/or the like). In some non-limiting embodiments, the web server may communicate the encrypted PAN to a security system (e.g., a hardware security module (HSM) of transaction service provider system 102 and/or the like). Additionally or alternatively, the security system (e.g., HSM) may communicate the PAN (e.g., in plain text, unencrypted, and/or the like) to the web server (e.g., in response to receiving the encrypted PAN from the web server).

In some non-limiting embodiments, the web server may receive authorization data from a user device of a user (e.g., before receiving and/or retrieving the account identifier). For example, the authorization data may include identification data (e.g., a username, an email address, a user number, any combination thereof, and/or the like), password data (e.g., a password, a passcode, a personal identification number (PIN), a one-time password (OTP) (e.g., a temporary one-time password (TOTP)), any combination thereof, and/or the like), biometric data (e.g., fingerprint data associated with a fingerprint, facial image data associated with an image of the user's face, any combination thereof, and/or the like), any combination thereof, and/or the like. In some non-limiting embodiments, the web server may verify the authorization data. For example, the web server may verify that the identification data corresponds to the password data and/or biometric data. Additionally or alternatively, if the authorization data is verified, the web server may determine that the user of the user device is an authorized user.

In some non-limiting embodiments, the web server may receive a request for displaying an account identifier from a user device of a user (e.g., before receiving and/or retrieving the account identifier). Additionally or alternatively, the web server may receive (e.g., retrieve) the account identifier (e.g., account identifier data associated therewith) in response to receiving the request from the user device.

As shown in FIG. 3, at step 304, process 300 may include converting the account identifier into at least one non-textual visual element. For example, a web server (e.g., transaction service provider system 102) may convert the account identifier data (e.g., PAN (e.g., in plain text, unencrypted, and/or the like) and/or the like) into at least one non-textual visual element.

In some non-limiting embodiments, the at least one non-textual visual element may include at least one of an image, a video comprising at least one frame (e.g., a plurality of frames (e.g., a series of frames, a sequence of frames, and/or the like) and/or the like), any combination thereof, and/or the like.

As shown in FIG. 3, at step 306, process 300 may include embedding at least one watermark in the at least one non-textual visual element. For example, a web server (e.g., transaction service provider system 102) may embed at least one watermark in the non-textual visual element(s).

In some non-limiting embodiments, the watermark(s) may include at least a portion of the identification data associated with the user (e.g., the username, the email address, the user number, any combination thereof, and/or the like). Additionally or alternatively, the watermark(s) may include a digital copy of a handwritten signature of the user.

In some non-limiting embodiments, embedding the watermark(s) may include the web server modifying at least one pixel of the non-textual visual element(s) based on the watermark. For example, modifying at least one pixel may include modifying a plurality of pixels. In some non-limiting embodiments, the pixel(s) may be modified so that a human user (e.g., the user of the user device) may perceive (e.g., see and/or the like) the watermark(s). Additionally or alternatively, the pixel(s) may be modified so that the watermark(s) may not be perceptible (e.g., seen, readily seen, and/or the like) by a human user (e.g., the user of the user device).

In some non-limiting embodiments, a user device (e.g., customer device 106, a device of issuer system 104, and/or the like) may receive a digital copy of a handwritten signature (e.g., as input to the user device from a user thereof). Additionally or alternatively, the user device may communicate the digital copy of the handwritten signature to the web server. In some non-limiting embodiments, the web server may receive the digital copy of the handwritten signature from the user device. Additionally or alternatively, the web server may embed the digital copy of the handwritten signature as a watermark in the non-textual visual element(s), as described herein.

As shown in FIG. 3, at step 308, process 300 may include encrypting the at least one non-textual visual element. For example, a web server (e.g., transaction service provider system 102) may encrypt the non-textual visual element(s) to form at least one encrypted non-textual visual element.

In some non-limiting embodiments, the web server may exchange at least one key with a user device (e.g., customer device 106, a device of issuer system 104, and/or the like). For example, the key(s) may include any suitable cryptographic key (e.g., an asymmetric key, a symmetric key, a session key, a public key, a private key, a public-private key pair, a secret key, and/or the like). Additionally or alternately, the web server and the user device may exchange the key(s) using any suitable key exchange protocol (e.g., public key certificates, handshake protocol, transport layer security (TLS) handshake, and/or the like).

In some non-limiting embodiments, exchanging the key(s) may include embedding the key(s) in the at least one non-textual visual element (e.g., encrypted non-textual visual element(s)). For example, the user device and the web server may each generate an array of random numbers (e.g., using the same seed value(s) for the same random number generation algorithm), and the web server may embed the key in the (encrypted) non-textual visual element(s) using the array of random numbers as indices. Additionally or alternatively, the web server may communicate the (encrypted) non-textual visual element(s) (e.g., with the key(s) embedded therein) to the user device, and the user device may extract the key from the (encrypted) non-textual visual element(s) using the array of random numbers as indices. Additionally or alternatively, the user device may store the key(s) and/or use the key(s) to decrypt the encrypted non-textual visual element(s).

In some non-limiting embodiments, the server may encrypt the non-textual visual element(s) based on the key(s) to form at least one encrypted non-textual visual element, as described herein.

As shown in FIG. 3, at step 310, process 300 may include communicating the at least one non-textual visual element. For example, a web server (e.g., transaction service provider system 102) may communicate the non-textual visual element(s) to a user device (e.g., customer device 106, a device of issuer system 104, and/or the like).

In some non-limiting embodiments, communicating the non-textual visual element(s) may include the web server communicating the non-textual visual element(s) having the watermark embedded therein to the user device. Additionally or alternatively, communicating the non-textual visual element(s) may include the web server communicating the encrypted non-textual visual element(s) to the user device. For example, the web server may communicate the encrypted non-textual visual element(s) having the watermark embedded therein to the user device.

In some non-limiting embodiments, the user device may render and/or display the at least one non-textual visual element. For example, the user device may include a browser and a renderer. Additionally or alternatively, the user device may use the renderer to render the non-textual visual element(s). Additionally or alternatively, the user device may use the browser to display the non-textual visual element(s) (e.g., as rendered).

In some non-limiting embodiments, the user device may decrypt the encrypted non-textual visual element(s) (e.g., based on the key(s) exchanged with the web server and/or the like) to form at least one decrypted non-textual visual element. Additionally or alternatively, displaying the non-textual visual element(s) may include the user device rendering and/or displaying the decrypted non-textual visual element(s). In some non-limiting embodiments, the decrypted non-textual visual element(s) may (or may not) include the watermark embedded therein.

Figure 4:
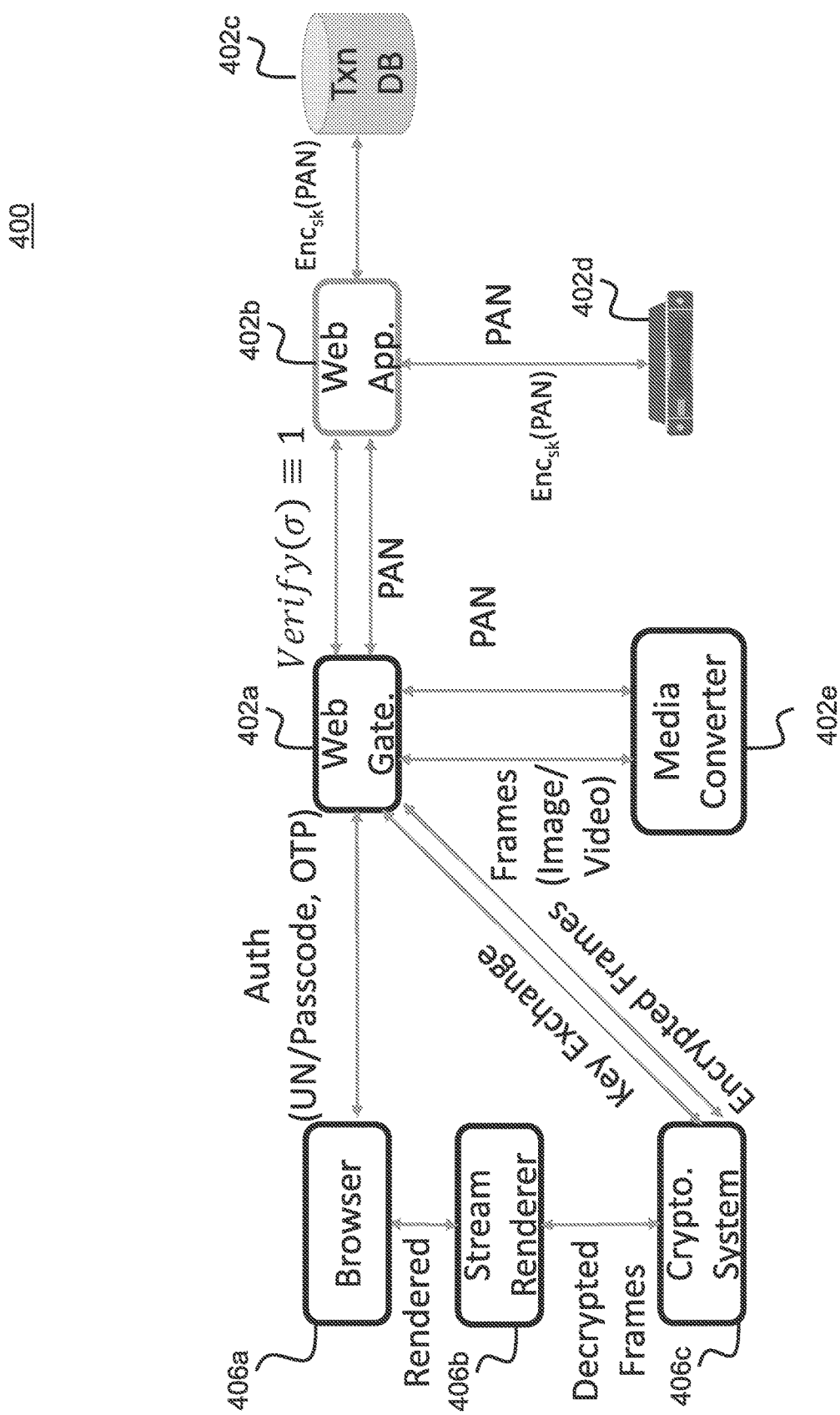
FIG. 4 is a diagram of a non-limiting exemplary implementation of a non-limiting embodiment of the process shown in FIG. 3 according to the principles of the presently disclosed subject matter.

Referring now to FIG. 4, FIG. 4 is a diagram of an exemplary implementation 400 of a non-limiting embodiment relating to process 300 shown in FIG. 3. As shown in FIG. 4, implementation 400 may include browser 406a, stream renderer 406b, cryptographic system 406c, web gateway 402a, web application 402b, transaction database 402c, HSM 402d, and/or media converter 402e. In some non-limiting embodiments, browser 406a, stream renderer 406b, and/or cryptographic system 406c may be the same as, similar to, and/or a part of a user device (e.g., as described herein with respect to FIG. 3), customer device 106, issuer system 104 (e.g., one or more devices of issuer system 104), and/or merchant system 108 (e.g., one or more devices of merchant system 108). In some non-limiting embodiments, web gateway 402a, web application 402b, transaction database 402c, HSM 402d, and/or media converter 402e may be the same as, similar to, and/or a part of a web server (e.g., as described herein with respect to FIG. 3), transaction service provider system 102 (e.g., one or more devices of issuer system 104), issuer system 104 (e.g., one or more devices of issuer system 104), and/or the like.

In some non-limiting embodiments, browser 406a may communicate authorization data to web gateway 402a, as described herein. Additionally or alternatively, web gateway 402a and/or web application 402b may verify the authorization data, as described herein. Additionally or alternatively, browser 406a may communicate a request for displaying an account identifier to web gateway 402a, as described herein. In some non-limiting embodiments, web gateway 402a may communicate the request to web application 402b.

In some non-limiting embodiments, web gateway 402a and/or web application 402b may retrieve the account identifier from transaction database 402c, as described herein. For example, web application 402b may retrieve an encrypted PAN (e.g., encrypted using a secret key and/or the like) from transaction database 402c (e.g., based on the request from browser 406a). Additionally or alternatively, web application 402b may communicate the encrypted PAN to HSM 402d. Additionally or alternatively, HSM 402d may communicate the PAN (e.g., in plain text, unencrypted, and/or the like) to web application 402b (e.g., in response to receiving the encrypted PAN from web application 402b).

In some non-limiting embodiments, web application 402b may communicate the PAN (e.g., in plain text, unencrypted, and/or the like) to web gateway 402a. Additionally or alternatively, web gateway 402a may communicate the PAN to media converter 402e. In some non-limiting embodiments, media converter 402e may convert the PAN into at least one non-textual visual element (e.g., a video comprising at least one frame (e.g., a plurality of frames and/or the like)), as described herein. Additionally or alternatively, media converter 402e may communicate the non-textual visual element(s) (e.g., frames) to web gateway 402a. In some non-limiting embodiments, web gateway 402a may encrypt the non-textual visual element(s) (e.g., frames) and/or embed a watermark in the non-textual visual element(s), as described herein.

In some non-limiting embodiments, web gateway 402a may communicate the non-textual visual element(s) (e.g., frames) to a user device (e.g., cryptographic system 406c and/or stream renderer 406b thereof). In some non-limiting embodiments, web gateway 402a may exchange at least one key with a user device (e.g., cryptographic system 406c thereof), as described herein. In some non-limiting embodiments, cryptographic system 406c may decrypt the non-textual visual element(s) (e.g., based on the key(s) exchanged), as described herein. Additionally or alternatively, stream renderer 406b may render the non-textual visual element(s) (e.g., as decrypted and/or the like), as described herein. In some non-limiting embodiments, browser 406a may display the non-textual visual element(s) (e.g., as rendered and/or the like), as described herein. Additionally or alternatively, the displayed non-textual visual element(s) may (or may not) include the watermark embedded therein, as described herein.

Figure 5A:
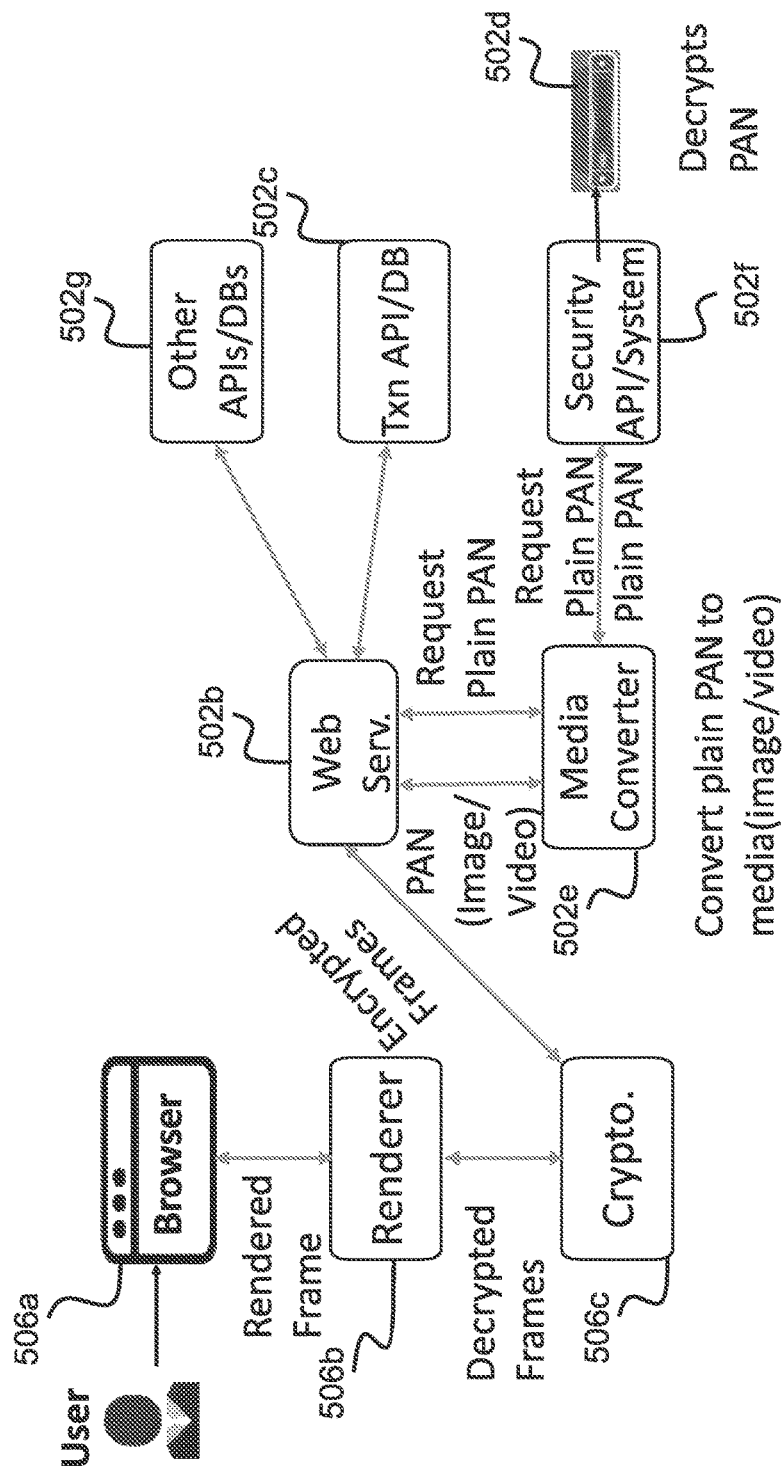
FIGS. 5A and 5B are diagrams a non-limiting exemplary implementation of a non-limiting embodiment of the process shown in FIG. 3 according to the principles of the presently disclosed subject matter.
Figure 5B:
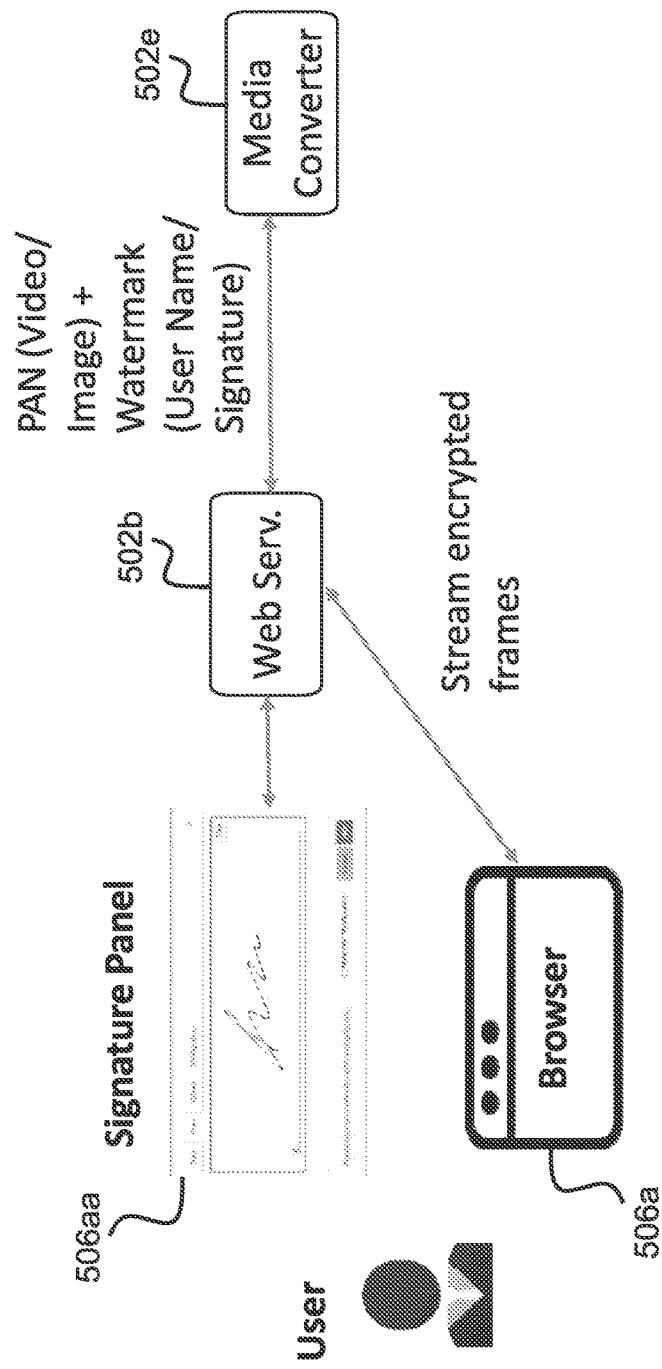

Referring now to FIGS. 5A and 5B, FIGS. 5A and 5B are diagrams of an exemplary implementation 500 of a non-limiting embodiment relating to process 300 shown in FIG. 3. As shown in FIGS. 5A and 5B, implementation 500 may include browser 506a, renderer 506b, cryptographic system 506c, web server 502b, transaction application programming interface (API)/database 502c, HSM 502d, media converter 502e, security API/system 502f, and/or other APIs/databases 502g. In some non-limiting embodiments, browser 506a, renderer 506b, and cryptographic system 506c may be the same as, similar to, and/or a part of a user device (e.g., as described herein with respect to FIG. 3), customer device 106, issuer system 104 (e.g., one or more devices of issuer system 104), and/or merchant system 108 (e.g., one or more devices of merchant system 108). Additionally or alternatively, browser 506a may be the same as or similar to browser 406a, renderer 506b may be the same as or similar to stream renderer 406b, and/or cryptographic system 506c may be the same as or similar to cryptographic system 406c. In some non-limiting embodiments, web server 502b, transaction API/database 502c, HSM 502d, media converter 502e, security API/system 502f, and/or other APIs/databases 502g may be the same as, similar to, and/or a part of a web server (e.g., as described herein with respect to FIG. 3), transaction service provider system 102 (e.g., one or more devices of issuer system 104), issuer system 104 (e.g., one or more devices of issuer system 104), and/or the like. Additionally or alternatively, web server 502b may be the same as or similar to web gateway 402a and/or web application 402b, transaction API/database 502c may be the same as or similar to transaction database 402c, HSM 502d may be the same as or similar to HSM 402d, and/or media converter 502e may be same as or similar to media converter 402e.

In some non-limiting embodiments, browser 506a may communicate authorization data to web server 502b, as described herein. Additionally or alternatively, web server 502b may verify the authorization data, as described herein. Additionally or alternatively, browser 506a may communicate a request for displaying an account identifier (e.g., PAN) to web server 502b, as described herein.

In some non-limiting embodiments, web server 502b may retrieve the account identifier from transaction API/database 502c, a described herein. For example, web server 502b may retrieve an encrypted PAN (e.g., encrypted using a secret key and/or the like) from transaction API/database 502c (e.g., based on the request from browser 506a). Additionally or alternatively, web server 502b may communicate a request for the unencrypted PAN (e.g., in plain text and/or the like) to media converter 502e, and the request from web server 502b may include the encrypted PAN.

In some non-limiting embodiments, media converter 502e may communicate the request for the unencrypted PAN and/or the encrypted PAN to security API/system 502f. Additionally or alternatively, security API/system 502f may communicate the request for the unencrypted PAN and/or the encrypted PAN to HSM 502d. In some non-limiting embodiments, HSM 502d may communicate the PAN (e.g., in plain text, unencrypted, and/or the like) to security API/system 502f, which may communicate the PAN to media converter 502e.

In some non-limiting embodiments, media converter 502e may convert the PAN into at least one non-textual visual element (e.g., an image, a video comprising at least one frame (e.g., a plurality of frames and/or the like), and/or the like), as described herein. Additionally or alternatively, media converter 502e may communicate the non-textual visual element(s) (e.g., frames) to web server 502b. In some non-limiting embodiments, web server 502b may encrypt the non-textual visual element(s) (e.g., frames) and/or embed a watermark in the non-textual visual element(s), as described herein.

In some non-limiting embodiments, web server 502b may communicate the non-textual visual element(s) (e.g., frames) to a user device (e.g., cryptographic system 506c and/or renderer 506b thereof). In some non-limiting embodiments, web server 502b may exchange at least one key with a user device (e.g., cryptographic system 506c thereof), as described herein. In some non-limiting embodiments, cryptographic system 506c may decrypt the non-textual visual element(s) (e.g., based on the key(s) exchanged), as described herein. Additionally or alternatively, renderer 506b may render the non-textual visual element(s) (e.g., as decrypted and/or the like), as described herein. In some non-limiting embodiments, browser 506a may display the non-textual visual element(s) (e.g., as rendered and/or the like), as described herein. Additionally or alternatively, the displayed non-textual visual element(s) may (or may not) include the watermark embedded therein, as described herein.

In some non-limiting embodiments, a user device and/or web browser 506a thereof may include a signature panel 506aa. Additionally or alternatively, signature panel 506aa may receive a digital copy of a handwritten signature (e.g., as input to the user device and/or web browser 506a thereof from a user), as described herein. Additionally or alternatively, the user device and/or signature panel 506aa may communicate the digital copy of the handwritten signature to web server 502b, as described herein. In some non-limiting embodiments, web server 502b may receive the digital copy of the handwritten signature, as described herein. Additionally or alternatively, web server 502b may embed the digital copy of the handwritten signature as a watermark in the non-textual visual element(s), as described herein.

Figure 6:
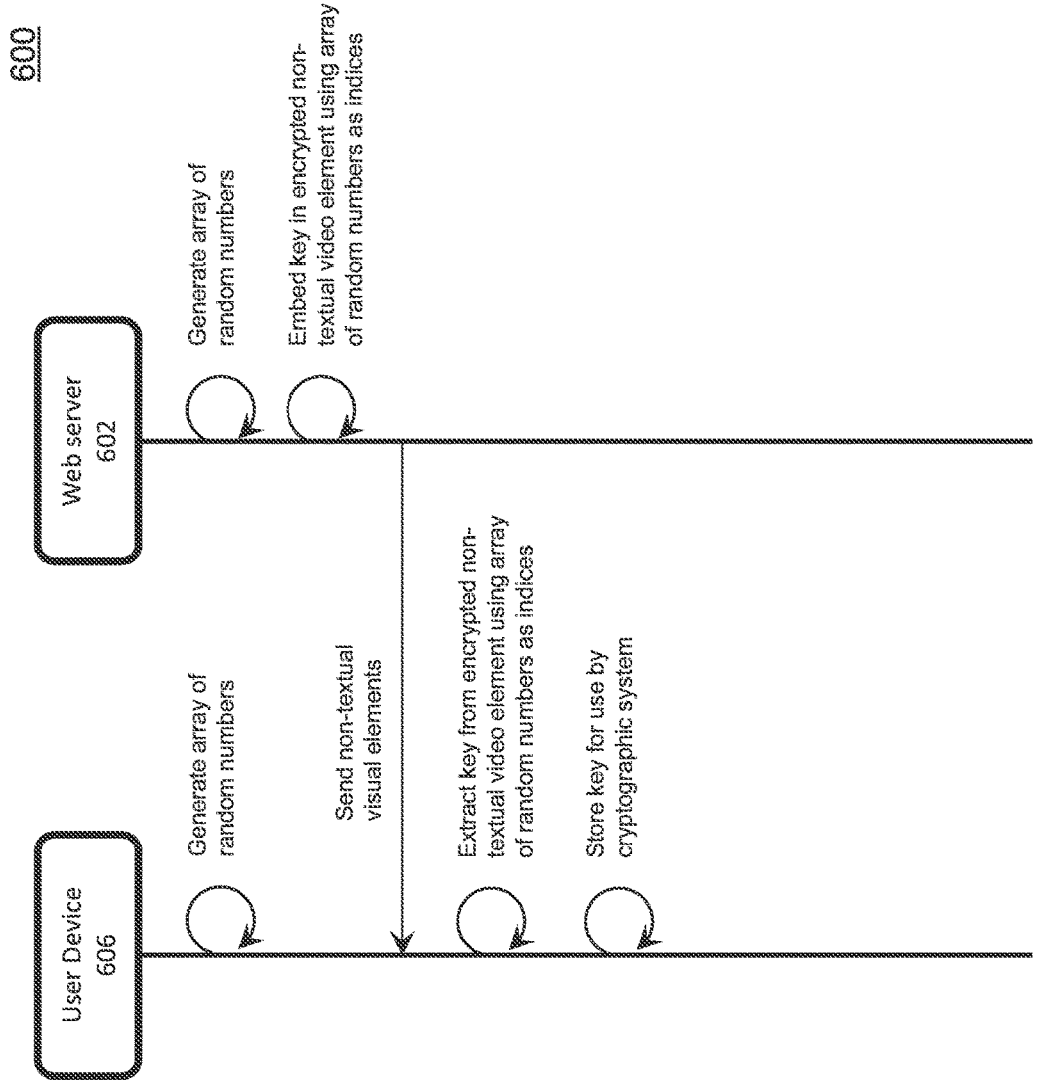
FIG. 6 is a diagram of a non-limiting exemplary implementation of a non-limiting embodiment of the process shown in FIG. 3 according to the principles of the presently disclosed subject matter.

Referring now to FIG. 6, FIG. 6 is a diagram of an exemplary implementation 600 of a non-limiting embodiment relating to process 300 shown in FIG. 3. As shown in FIG. 6, implementation 600 may include user device 606 and/or web server 602. In some non-limiting embodiments, user device 606 may be the same as, similar to, and/or a part of a user device (e.g., as described herein with respect to FIG. 3), customer device 106, issuer system 104 (e.g., one or more devices of issuer system 104), and/or merchant system 108 (e.g., one or more devices of merchant system 108). In some non-limiting embodiments, web server 602 may be the same as, similar to, and/or a part of a web server (e.g., as described herein with respect to FIG. 3), transaction service provider system 102 (e.g., one or more devices of issuer system 104), issuer system 104 (e.g., one or more devices of issuer system 104), and/or the like.

In some non-limiting embodiments, web server 602 may exchange at least one key with user device 606, as described herein. For example, exchanging the key(s) may include embedding the key(s) in the at least one non-textual visual element (e.g., encrypted non-textual visual element(s)).

In some non-limiting embodiments, user device 606 and web server 602 may each generate an array of random numbers. For example, user device 606 and web server 602 may each generate the same array of random numbers by using the same seed value(s) for the same random number generation algorithm. In some non-limiting embodiments, the seed value(s) may be generated by each of user device 606 and web server 602 using a shared key. Additionally or alternatively, the shared key may be dynamically generated by web server 602. For example, web server 602 may combine a key-encryption-key (KEK) with identification information of a user of user device 606 (e.g., a username and/or the like) using a hash function to provide the shared key. Additionally or alternatively, web server 602 may communicate the shared key to user device 606 using any suitable key exchange protocol (e.g., public key certificates, handshake protocol, transport layer security (TLS) handshake, and/or the like). In some non-limiting embodiments, user device 606 and web server 602 may each use the shared key to generate a TOTP. Additionally or alternatively, the TOTP may be used as the seed value(s). For example, user device 606 and web server 602 may each parse the TOTP into a plurality of seed values (e.g., three seed values X, Y, and Z and/or the like).

In some non-limiting embodiments, user device 606 and web server 602 may each use the seed value(s) (e.g., three seed values X, Y, and Z and/or the like) as inputs to the same random number generation algorithm to thereby provide the same array of random numbers. For example, user device 606 and web server 602 may each use the following random number generation algorithm:

Algorithm 1:

$\alpha \in (0, 0.015)$
$\beta \in (0, 0.022)$
$\gamma \in (3.53, 3.81)$
$X, Y, Z \in (0,1)$ -continued Algorithm 1:

```
N = 44
PSR(X, Y, Z, N):
    if N > 0 :
        x = (γ × X × (1 − X)) + (β × Y² × X) + (α × Z³)
        y = (γ × Y × (1 − Y)) + (β × Z² × Y) + (α × X³)
        z = (γ × Z × (1 − Z)) + (β × X² × Z) + (α × Y³)
        ARRAY.addTuple(x, y, z)
        return (x, y, z, N − 1)
    else :
        return ARRAY
```

In some non-limiting embodiments, α, β, and γ may be selectable constants, e.g., with the ranges for each may be specified in Algorithm 1. Additionally or alternatively, for each call of the function PSR in Algorithm 1, a tuple of 3 numbers may be added into the array of random numbers. Additionally or alternatively, the resulting array of random numbers may have a selectable number N of tuples (e.g., 44 tuples, as shown in Algorithm 1). For example, 44 may be the number of characters that may be embedded in the payload of a key (e.g., a Base 64 encoded key and/or the like).

In some non-limiting embodiments, web server 602 may embed the key in the (encrypted) non-textual visual element(s) using the array of random numbers as indices. For example, embedding may include hiding information inside the (encrypted) non-textual visual element(s). For the purpose of illustration, an array of N random numbers (e.g., tuples of random numbers) may be obtained from the algorithm described above. Additionally or alternatively, these random numbers may be used as an index which represents the position at which each of the N characters of the key may be placed inside the (encrypted) non-textual visual element(s) (e.g., a Base 64 encoded encrypted video string). For example, the random numbers may be whole numbers and/or may be in the range of (0, FILE_SIZE), where FILE_SIZE is the size of the encrypted video string, and this may be accomplished by using a round-up function and/or a mod function. For the purpose of illustration, if a base 64 encoded encrypted video string is 66000 characters long, the probability of finding a 44-character-long key via brute force may be of the order −289484. In some non-limiting embodiments, web server 602 may communicate the (encrypted) non-textual visual element(s) (e.g., with the key(s) embedded therein) to user device 606.

In some non-limiting embodiments, user device 606 may extract the key from the (encrypted) non-textual visual element(s) using the array of random numbers as indices. For example, user device 606 may generate the same array of random numbers as web server 602, e.g., using the same seed value(s) and algorithm used by web server 602, as described herein. Additionally or alternatively, user device 606 may traverse the array of random numbers (e.g., in reverse order, back to front, and/or the like) and use each random number as an index to identify a respective character of the key within the encrypted video string. Additionally or alternatively, these characters may be extracted by user device 606. In some non-limiting embodiments, after extraction, the key may be used to decrypt the encrypted video. For example, user device 606 may store the key(s) and/or use the key(s) to decrypt the encrypted non-textual visual element(s).

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method, comprising:
   receiving, with at least one processor, account identifier data associated with at least one account identifier;
   converting, with the at least one processor, the account identifier data into at least one non-textual visual element;
   embedding, with the at least one processor, at least one watermark in the at least one non-textual visual element, wherein the at least one watermark comprises a digital copy of a handwritten signature, and wherein embedding the at least one watermark comprises modifying at least one pixel of the at least one non-textual visual element based on the watermark; and
   after embedding the at least one watermark in the at least one non-textual visual element, communicating, with the at least one processor, the at least one non-textual visual element to at least one receiver.

2. The method of claim 1, wherein the at least one receiver renders the at least one non-textual visual element.

3. The method of claim 1, wherein the at least one non-textual visual element comprises an image.

4. The method of claim 1, wherein the at least one non-textual visual element comprises a video comprising at least one frame.

5. The method of claim 1, further comprising:
   encrypting, with the at least one processor, the at least one non-textual visual element to form at least one encrypted non-textual visual element,
   wherein communicating the at least one non-textual visual element comprises communicating the at least one encrypted non-textual visual element to the at least one receiver.

6. The method of claim 5, further comprising:
   exchanging, with the at least one processor, at least one key with the at least one receiver.

7. The method of claim 6, wherein exchanging the at least one key comprises embedding the at least one key in the at least one non-textual visual element.

8. The method of claim 1, wherein modifying the at least one pixel comprises modifying a plurality of pixels so that the digital copy of the handwritten signature is not perceptible by a human user.

9. A system, comprising:
   a user device;
   a hardware security module (HSM); and
   a server, the server configured to:
      receive, from the user device, a request for displaying an account identifier;
      retrieve, from the HSM, account identifier data associated with the account identifier;
      convert the account identifier data into at least one non-textual visual element;
      embed at least one watermark in the at least one non-textual visual element, wherein the at least one watermark comprises a digital copy of a handwritten signature, and wherein embedding the at least one watermark comprises modifying at least one pixel of the at least one non-textual visual element based on the watermark; and after embedding the at least one watermark in the at least one non-textual visual element, communicate the at least one non-textual visual element to the user device.

10. The system of claim 9, wherein the user device comprises a browser and a renderer, and wherein the user device is configured to:

render, with the renderer, the at least one non-textual visual element; and display, with the browser, the at least one non-textual visual element as rendered.

11. The system of claim 10, wherein:

the server is further configured to:

exchange at least one key with the user device; and encrypt the at least one non-textual visual element based on the at least one key to form at least one encrypted non-textual visual element, wherein communicating the at least one non-textual visual element comprises communicating the at least one encrypted non-textual visual element to the user device; and the user device is further configured to:

decrypt the at least one encrypted non-textual visual element based on the at least one key to form at least one decrypted non-textual visual element, wherein displaying the at least one non-textual visual element comprises displaying the at least one decrypted non-textual visual element.

12. The system of claim 9, wherein:

the user device is configured to:

receive the digital copy of a handwritten signature; and communicate the digital copy of the handwritten signature to the server; and the server is further configured to:

receive the digital copy of the handwritten signature from the user device.

13. The system of claim 9, wherein modifying the at least one pixel comprises modifying a plurality of pixels so that the digital copy of the handwritten signature is not perceptible by a human user.

14. A computer program product, the computer program product comprising at least one non-transitory computer-readable medium including one or more instructions that, when executed by at least one processor, cause the at least one processor to:

receive account identifier data associated with at least one account identifier;

convert the account identifier data into at least one non-textual visual element;

embed at least one watermark in the at least one non-textual visual element, wherein the at least one watermark comprises a digital copy of a handwritten signature, and wherein embedding the at least one watermark comprises modifying at least one pixel of the at least one non-textual visual element based on the watermark; and after embedding the at least one watermark in the at least one non-textual visual element, communicate the at least one non-textual visual element to at least one receiver.

15. The computer program product of claim 14, wherein the at least one non-textual visual element comprises at least one of an image, a video comprising at least one frame, or any combination thereof.

16. The computer program product of claim 14, wherein the instructions, when executed by the at least one processor, further cause the at least one processor to:

exchange at least one key with the at least one receiver; and encrypt the at least one non-textual visual element based on the at least one key to form at least one encrypted non-textual visual element, wherein communicating the at least one non-textual visual element comprises communicating the at least one encrypted non-textual visual element to the at least one receiver.

17. The computer program product of claim 14, wherein modifying the at least one pixel comprises modifying a plurality of pixels so that the at least one watermark is not perceptible by a human user.

\* \* \* \* \*